(12) United States Patent
Kümmel et al.

(10) Patent No.: US 8,395,491 B2
(45) Date of Patent: Mar. 12, 2013

(54) METHOD FOR CONTROLLING DRIVING STABILITY

(75) Inventors: Martin Kümmel, Spangenberg (DE); Schahrad Schafiyha, Frankfurt am Main (DE); Henning Raulfs, Bad Homburg (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 43 days.

(21) Appl. No.: 10/480,554

(22) PCT Filed: Jun. 10, 2002

(86) PCT No.: PCT/EP02/06343
§ 371 (c)(1),
(2), (4) Date: Dec. 12, 2003

(87) PCT Pub. No.: WO02/100696
PCT Pub. Date: Dec. 19, 2002

(65) Prior Publication Data
US 2004/0215384 A1    Oct. 28, 2004

(30) Foreign Application Priority Data
Jun. 13, 2001    (DE) .................................. 101 28 357

(51) Int. Cl.
*B60Q 1/00* (2006.01)
(52) U.S. Cl. ........ 340/439; 340/438; 340/441; 180/446; 701/48

(58) Field of Classification Search .................. 340/439, 340/436, 437, 438, 440, 905, 988, 441; 701/41, 701/42, 48, 36; 180/421, 422, 443, 446
See application file for complete search history.

(56) References Cited

U.S. PATENT DOCUMENTS

| | | | | |
|---|---|---|---|---|
| 5,576,959 A * | 11/1996 | Hrovat et al. | ................... | 701/70 |
| 5,579,245 A * | 11/1996 | Kato | .............................. | 702/150 |
| 5,774,821 A * | 6/1998 | Eckert | .............................. | 701/78 |
| 5,925,083 A * | 7/1999 | Ackermann | ..................... | 701/41 |
| 6,502,023 B1 * | 12/2002 | Fukada | .............................. | 701/38 |
| 2002/0161505 A1 * | 10/2002 | Reich et al. | ..................... | 701/72 |

FOREIGN PATENT DOCUMENTS

| | | |
|---|---|---|
| DE | 19615311 | 10/1997 |
| DE | 19907633 | 10/1999 |
| DE | 19848236 | 4/2000 |
| EP | 1087358 | 3/2001 |

* cited by examiner

*Primary Examiner* — Hung T. Nguyen

(57) ABSTRACT

The present invention relates to a method for controlling driving stability of a vehicle wherein a number of input variables are used to control the driving speed of the vehicle to a limit speed. In order to prevent unstable driving conditions in a pre-controlled manner, a model-based stable limit speed of the vehicle is determined on the basis of measured variables that are detected by means of detection devices and represent the current steering angle and the current lateral acceleration, by including other quantities of the vehicle and/or the driving situation, and the driving speed is compared to the model-based stable limit speed of the vehicle, and based on the comparison result, the driving speed is adapted to the limit speed when the driving speed exceeds the limit speed.

11 Claims, 1 Drawing Sheet

Vehicle with Brake Control System and ESP Sensor System

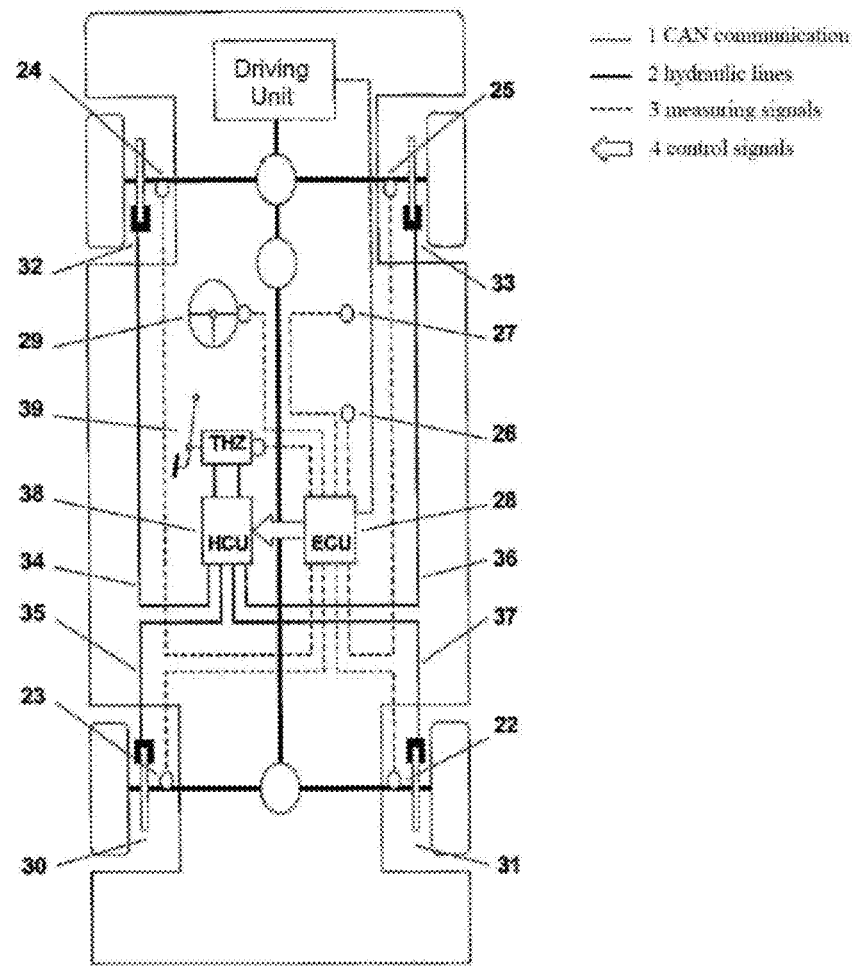
Vehicle with Brake Control System and ESP Sensor System

METHOD FOR CONTROLLING DRIVING STABILITY

This application is the U.S. national phase of international application PCT/EP02/06343 filed Jun. 10, 2002, which designated the U.S. and which claims the benefit of priority of German Patent Application Number 101 28 357.1 filed Jun. 13, 2001. The contents of each of the aforementioned documents are incorporated herein in their entirety.

TECHNICAL FIELD

The present invention generally relates to a method for controlling driving stability of a vehicle and more particularly relates to a method for limiting vehicle speed.

BACKGROUND OF THE INVENTION

Vehicle instability is likely to occur in defined driving situations especially when the vehicle speed is not adapted to vehicle or road conditions. Various driving stability control systems have become known in the art that aim at automatically counteracting vehicle instability.

SUMMARY OF THE INVENTION

There are basically five principles of influencing the driving performance of a vehicle by means of predeterminable pressures or brake forces in or at individual wheel brakes and by means of intervention into the engine management of the driving engine. These principles are brake slip control (ABS) intended to prevent individual wheels from locking during a braking operation, traction slip control (TSC) preventing the driven wheels from spinning, electronic brake force distribution (EBV) controlling the ratio of brake forces between front and rear axle of the vehicle, anti rollover braking (ARB) preventing rollover of the vehicle about its longitudinal axis, as well as yaw torque control (ESP) ensuring stable driving conditions when the vehicle yaws about its vertical axis.

Hence, the term 'vehicle' in this context implies a motor vehicle with four wheels, which is equipped with a hydraulic, electrohydraulic or electromechanical brake system. The driver is able to develop brake pressure in the hydraulic brake system by means of a pedal-operated master cylinder, while the electrohydraulic and electromechanical brake systems develop a brake force responsive to the sensed braking demand of the driver.

Further, the vehicle is equipped with a thermodynamic or electric driving system applying traction torque depending on the driver's demand to at least one wheel of the vehicle by way of the drive train.

To sense driving-dynamics condition[s], there are four rotational speed sensors, one per wheel, i.e. one yaw velocity sensor, one lateral acceleration sensor and at least one pressure sensor for the brake pressure generated by the brake pedal. Instead of the pressure sensor, a pedal-travel or pedal-force sensor may also be used if the auxiliary pressure source is so arranged that brake pressure built up by the driver cannot be distinguished from the brake pressure of the auxiliary pressure source. The driving torque currently generated by the driving system and the torque the driver demands are determined in addition. These variables may also be variables that are indirectly determined, e.g. derived from engine performance characteristics.

The driving performance of a vehicle is influenced in a driving stability control operation so that the vehicle is better to master for the driver in critical situations. A critical situation in this respect is an unstable driving condition when the vehicle will not follow the instructions of the driver in the extreme case. Thus, the function of driving stability control in such situations is to impart to the vehicle the vehicle performance the driver requests, within physical limits. While longitudinal slip of the tires on the roadway is significant in first place for brake slip control, traction slip control and electronic brake force distribution, further variables are included in yaw torque control (YTC), for example, the yaw rate and tire slip angle velocity.

Mostly, the cause of the critical situation is a generally too high driving speed for a given driving situation. The given driving situation is characterized by a predefined desired curve radius and by the coefficient of friction between tires and roadway.

It would be desirable to avoid unstable driving situations, which the driver frequently cannot master, already as they develop so that critical driving situations are prevented from occurring.

An object of the present invention is to provide a method and a driving dynamics control system for detecting imminent vehicle instability as a result of too high driving speed and to counteract unstable driving conditions already as they develop in a pre-controlling manner.

One possibility of reducing the speed of a vehicle in an understeer case is described in EP 0 945 320 A1 wherein an adjustment value for the longitudinal deceleration is calculated from the deviation of the measured steering angle from a calculated steering angle. Apart from other quantities, a maximum value of the lateral acceleration (saturation value) assessed in real time is taken into consideration in the calculation of the steering angle.

This object is achieved by the present invention in that a model-based stable limit speed of the vehicle is determined on the basis of measured variables that are detected by means of detection devices and represent the current steering angle and the current lateral acceleration, by including other quantities of the vehicle and/or driving situations, wherein the driving speed is compared to the model-based stable limit speed of the vehicle, and based on the result of comparison, the driving speed is adapted to the limit speed when the driving speed exceeds the limit speed.

A method of this type allows adapting the driving speed to the model-based stable limit speed especially during cornering in order to avoid unstable driving conditions in a pre-controlled manner, thereby preventing that excessive vehicle acceleration will cause the vehicle speed to exceed a maximum speed derived from the driving situation. To this end, the maximum speed is found out in a given driving situation permitting to pass through this driving situation at the stability limit. Further, it is found out whether there is a tendency of exceeding this maximum speed and, thus, a tendency towards a subsequent unstable driving behavior, and that in this case the vehicle is prevented from exceeding the maximum speed by engine or brake intervention already when stable driving performance prevails. The result is that a critical driving situation is either avoided already as it develops, or instability is reduced to an extent enabling the driver to master the situation. This counteracts imminent instability of the vehicle already as it is produced so that unstable driving conditions in cornering maneuvers can be avoided during which, for example, the yaw torque controller (ESP interventions) would have to intervene. In dependence on vehicle state variables and/or information about the driving performance or driving situation, it can be determined how the stable limit speed is modeled by varying the steering angle deviation tolerated.

Another objective of the invention is to design a generic driving stability control system for a vehicle in such a way that driving stability control is characterized by a steering angle detection device for determining a steering angle of the steering wheel, a lateral acceleration detection device for determining lateral acceleration, a computing device for computing a stable limit speed from the determined quantities steering angle of the steering wheel and lateral acceleration by including further quantities of the vehicle and/or driving situations, a speed detection device for detecting a current vehicle speed and a speed control device controlling the vehicle speed to the calculated stable limit speed as soon as the vehicle speed shows the tendency of exceeding the stable limit speed.

To enhance driving stability it is suitable that the stable limit speed is directly determined from quantities prevailing in an ESP controlled vehicle. Advantageously, the limit speed is directly determined according to the recursive relation $$v_{limit} = \sqrt{\frac{l * a_q}{\delta - \Delta\delta_{tol} - a_q * EG}}$$

where
- $\delta$—steering angle of the steering wheel at the wheel
- $\Delta\delta_{tol}$ tolerated steering angle deviation compared to the linear case
- l—distance of the vehicle axles (wheel base)
- $v_{limit}$ stable limit speed
- EG—self-steering gradient of the vehicle
- $\alpha_q$—vehicle lateral acceleration.

Advantageously, the speed difference between driving speed and stable limit speed is reduced by way of a brake and/or engine intervention, and it can be defined in dependence on vehicle state variables and/or information about the driving performance or the driving situation at what intensity interventions are executed.

It is favorable that the control of the driving speed to the limit speed is terminated when a driving speed desired by the driver is found out which lies below the stable limit speed.

According to another favorable embodiment, the lateral inclination of the vehicle or the roadway with respect to the horizontal plane is determined, and the tolerated steering angle deviation is computed in dependence on the determined lateral inclination.

It is expedient that the steering angle deviation is increased in driving situations with an increased traction requirement.

BRIEF DESCRIPTION OF THE DRAWINGS

FIG. 1 is a diagrammatic view of a vehicle having ESP control system, brake system, sensor system and communication means.

DETAILED DESCRIPTION OF THE PREFERRED EMBODIMENTS

Now referring to FIG. 1, the four wheels are designated by reference numerals 15, 16, 20, 21. One wheel sensor 22 to 25 is provided on each of the wheels 15, 16, 20, 21. The signals are sent to an electronic control unit 28 determining the vehicle speed $V_{Ref}$ from the wheel rotational speeds by way of predetermined criteria. Further, a yaw rate sensor 26, a lateral acceleration sensor 27, and a steering angle sensor 29 are connected to the electronic control unit 28. Each wheel additionally includes an individually controllable wheel brake 30 to 33. Said brakes are hydraulically operated and receive pressurized hydraulic fluid by way of hydraulic lines 34 to 37. Brake pressure is adjusted by means of a valve block 38, said valve block being actuated independently of the driver on command of electric signals that are generated in the electronic control unit 28. The driver is able to introduce brake pressure into the hydraulic lines by way of a master cylinder actuated by a brake pedal. Pressure sensors P that allow sensing the driver's braking demand are provided in the master cylinder or the hydraulic lines. The electronic control unit is connected to the engine control device by way of an interface (CAN).

By way of the ESP control system with brake system, sensor system and communication means including the components
- Four wheel speed sensors
- Pressure sensor (P)
- Lateral acceleration sensor (LA)
- Yaw rate sensor (YR)
- Steering angle sensor (SWA)
- individually actuatable wheel brakes
- Hydraulic unit (HCU)
- Electronic control unit (ECU)

it is possible to realize a forecast of a critical driving situation and, preferably, avoid it without the use of additional sensors. Based on the equation for the stationary circular travel of the linear one-track model $$\dot{\Psi} = \frac{\delta \cdot v}{l + v^2 \cdot EG}$$

and the relation $$\dot{\Psi} = \frac{a_q}{v}$$

where
- $\dot{\Psi}$—yaw rate of the vehicle
- $\delta$—steering angle of the front wheels
- v—vehicle speed
- l—axle base
- EG—self-steering gradient of the vehicle
- $\alpha_q$—lateral acceleration of the vehicle it is possible to calculate the stable vehicle speed in a driving situation by way of the equation $$v = \sqrt{\frac{l \cdot a_q}{\delta - a_q \cdot EG}}.$$

Reaching of the stability limit announces itself by leaving the linear range. Thus, the stable limit speed of a driving situation can be determined by taking into consideration a tolerated steering angle deviation compared to the linear performance.

$$v_{limit} = \sqrt{\frac{l \cdot a_q}{\delta - \Delta\delta_{tol} - a_q \cdot EG}}$$

wherein
$v_{limit}$—stable limit speed $\Delta\delta_{tol}$—tolerated steering angle deviation compared to the linear case.

The higher the magnitude of tolerated steering angle deviation is chosen, the better the calculated limit speed and the stability reserve will be utilized.

Appropriately, the limit speed is calculated continuously, and it is set for infinity should there be no real solution of the above equation for the current input variables. With a stable driving style, the limit speed will always lie above the actual vehicle speed. Only when approaching the stability limit will the limit speed be reached or exceeded. This may e.g. be caused by a sharper steering inwards, by vehicle acceleration, or by reducing the coefficient of friction between tires and roadway and, thus, by reducing the lateral acceleration. It is of no significance, whether the vehicle understeers, oversteers or drifts off laterally when the stability limit is exceeded.

According to the invention, execution of a brake or engine intervention will counteract the exceeding of the stability limit as soon as the measured vehicle speed has a tendency to exceeding the limit speed that is calculated according to the above equation. The brake and/or engine intervention will now be carried out in such a way that the vehicle speed is controlled to the limit speed. This maintains the vehicle in the stable limit range. It is easy for the driver to master the vehicle. In addition, abrupt and disharmonious control interventions are avoided, exactly as they are produced by yaw torque control when the stability limit is exceeded.

Brake and/or engine intervention is terminated as soon as the vehicle speed desired by the driver lies considerably below the calculated limit speed. This may e.g. be caused by steering outwards when leaving a curve, by vehicle deceleration or by increasing the coefficient of friction between tires and roadway and, thus, by increasing the lateral acceleration.

When the roadway has a lateral inclination, the lateral acceleration used to calculate the stable limit speed may be determined as too low a quantity. To prevent that the limit speed is calculated as a too low quantity, it is suitable to appropriately determine the lateral inclination of the roadway and to increase the tolerated steering angle deviation in dependence on the lateral inclination.

In driving situations requiring increased traction, that means e.g. when driving in sand or deep snow, great steering angles may temporarily occur without the vehicle moving at the stability limit. In addition, driving torque reductions are extremely disturbing in these situations because they may cause the vehicle to dig into the ground and get stuck. These situations are characterized e.g. by wheel brake slip on at least one front wheel with a positive driving torque and lacking brake torque of the wheel brake. When this situation is detected, it is likewise expedient to increase the tolerated steering angle deviation.

The invention claimed is:

1. Method for controlling driving stability of a vehicle, comprising:
   establishing by means of detection devices a current steering angle and a current lateral acceleration;
   determining a model-based stable limit speed of the vehicle, wherein the model-based stable limit speed is determined based on the current steering angle and the current lateral acceleration wherein a driving speed is compared to the model-based stable limit speed of the vehicle, and based on a result of comparison, the driving speed is adapted to the limit speed when the driving speed exceeds the limit speed; and
   wherein the model-based stable limit speed is determined according to the recursive relation $$v_{limit} = \sqrt{\frac{l * a_q}{\delta - \Delta\delta_{tol} - a_q * EG}}$$

where
   $\delta$ is a steering angle of the steering wheel at the front wheels
   $\xi$ is wheel base
   EG is a self-steering gradient of the vehicle
   $a_G$ is a vehicle lateral acceleration
   $v_{limit}$ is a stable limit speed
   $\Delta\delta_{tol}$ is a tolerated steering angle deviation compared to the linear case.

2. Method as claimed in claim 1, further including the step of:
   conducting a brake intervention or engine intervention according to the difference between the driving speed and the limit speed.

3. Method as claimed in claim 1, wherein the tolerated steering angle deviation is determined according to the lateral acceleration and the driving speed.

4. Method as claimed in claim 1, further including the step of:
   terminating the control of the driving speed towards the limit speed when a driving speed desired by the driver is determined which lies below the model-based stable limit speed.

5. Method as claimed in claim 1, further including the step of:
   determining the lateral inclination of the vehicle or the roadway with respect to the horizontal plane, and computing the tolerated steering angle deviation in dependence on the determined lateral inclination.

6. Method as claimed in claim 5, further including the step of:
   increasing the steering angle deviation tolerated in driving situations with an increased traction requirement.

7. Driving stability control system for a vehicle, comprising:
   a control device for controlling the vehicle speed;
   a steering angle detection device for detecting a steering angle of a steering wheel of the vehicle;
   a lateral acceleration detection device for determining a lateral acceleration of the vehicle;
   a computing device for computing a stable limit speed from the determined quantities steering angle of the steering wheel and lateral acceleration of the vehicle;
   a speed detection device for detecting a current vehicle speed, wherein said control device controls the vehicle speed to a calculated stable limit speed whenever the vehicle speed exceeds the stable limit speed; and
   wherein the computing devise determines the stable limit speed according to the recursive relation $$v_{limit} = \sqrt{\frac{l * a_q}{\delta - \Delta\delta_{tol} - a_q * EG}}$$

where
   $\delta$ is a steering angle of the steering wheel at the front wheels
   $\xi$ is wheel base
   EG is a self-steering gradient of the vehicle
   $a_q$ is a vehicle lateral acceleration
   $v_{limit}$ is a stable limit speed $\Delta\delta_{tol}$ is a tolerated steering angle deviation compared to the linear case.

8. Driving stability control as claimed in claim 7, wherein the control device controls the vehicle speed so that it does not exceed the stable limit speed by means of brake intervention or by intervention into the engine driving torque.

9. Driving stability control as claimed in claim 8, wherein the brake or engine intervention is terminated as soon as the vehicle speed desired by the driver lies below the stable limit speed.

10. Driving stability control as claimed in claim 7, further including a lateral inclination detection device for determining a lateral inclination of the roadway which information is in turn used by the computing device to alter the steering angle deviation tolerated in dependence on the determined lateral inclination.

11. Driving stability control as claimed in claim 7, further including a determining unit for determining the traction of the vehicle wherein the computing device uses this information to alter the steering angle deviation tolerated.

* * * * *